H. A. FREY.
HORSESHOE.
APPLICATION FILED JULY 26, 1919. RENEWED JAN. 5, 1921.
1,386,613.
Patented Aug. 9, 1921.
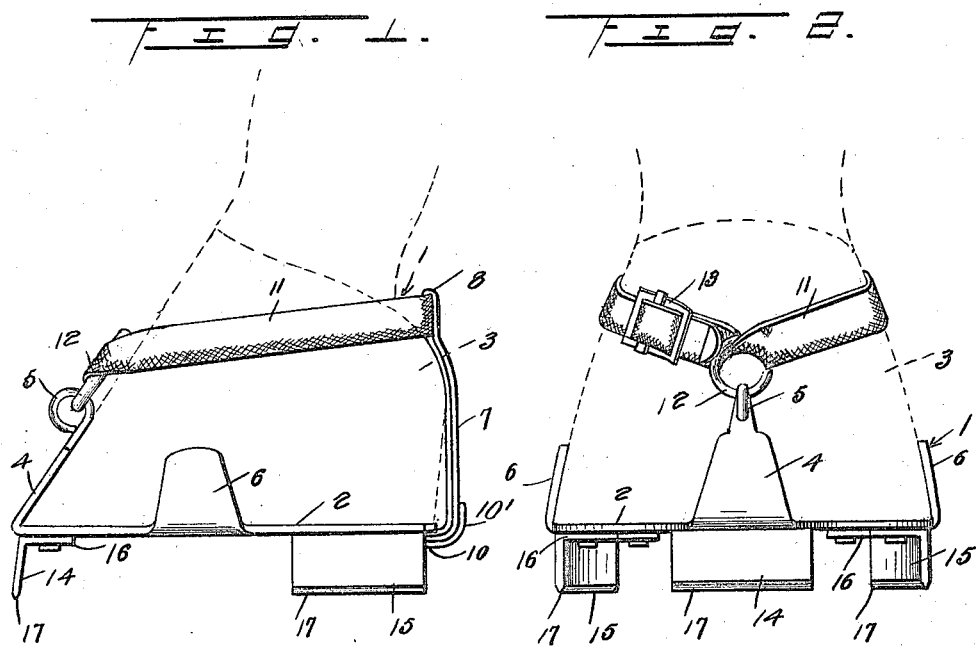
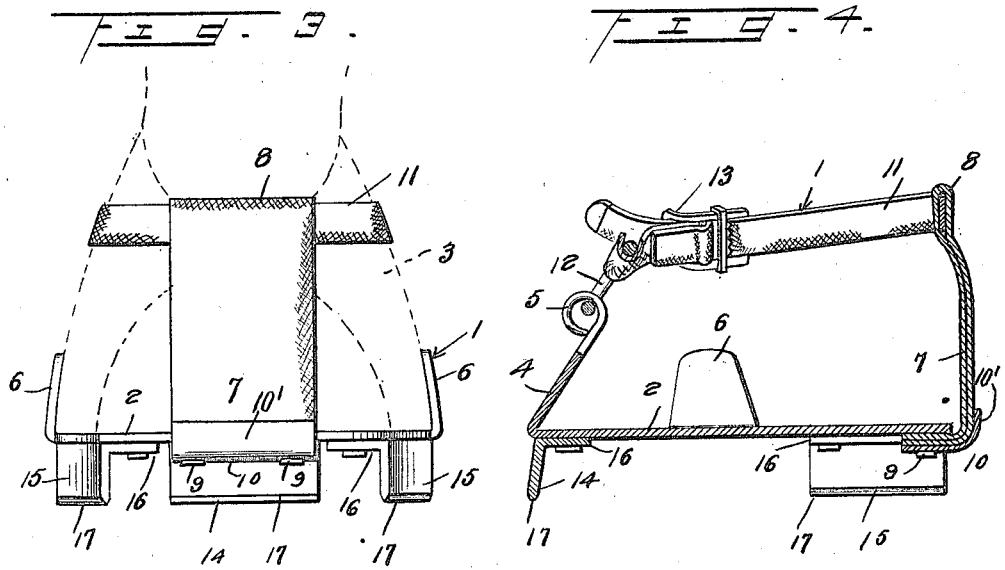
Inventor.
H. A. Frey.
Attorney.

UNITED STATES PATENT OFFICE.

HERMAN A. FREY, OF SAVOY, ILLINOIS.

HORSESHOE.

1,386,613. Specification of Letters Patent. Patented Aug. 9, 1921.

Application filed July 26, 1919, Serial No. 313,487. Renewed January 5, 1921. Serial No. 435,252.

*To all whom it may concern:*

Be it known that I, HERMAN A. FREY, a citizen of the United States, residing at Savoy, in the county of Champaign and State of Illinois, have invented certain new and useful Improvements in Horseshoes; and I do hereby declare the following to be a full, clear, and exact description of the invention, such as will enable others skilled in the art to which it appertains to make and use the same.

This invention relates to horseshoes, and the primary object of the invention is to provide an improved horseshoe, which can be readily attached to or removed from the horse's hoof, and one in which the use of nails for holding the shoe in place is eliminated.

Another object of the invention is the provision of an improved horseshoe, which completely underlies the horse's hoof and is provided with improved means for engaging the forward portion of the horse's hoof to prevent displacement thereof and with flexible means for engaging the rear portion of the horse's hoof and a flexible strap for holding the shoe in position.

A further object of the invention is to provide an improved shoe which can be readily attached to a horse's hoof having means for completely covering the hoof, and calks formed on said means whereby the shoe can be used to best advantage on slippery pavements.

A still further object of the invention is to provide an improved horseshoe of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings, forming a part thereof, in which:

Figure 1 is a side elevation showing the improved horseshoe applied to a horse's hoof, Fig. 2 is a front view thereof, Fig. 3 is a rear view, and Fig. 4 is a detail longitudinal section through the shoe.

Referring to the drawings in detail, wherein similar reference characters designate corresponding parts throughout the several views, the numeral 1 generally indicates the improved shoe, which includes the substantially flat metallic plate 2 which is shaped as shown to conform to the configuration of the horse's hoof 3, to which it is shown applied. The forward edge of the plate 2 is provided with a lip 4 which is adapted to engage the forward portion of the hoof 3, and this lip has its upper end reduced and coiled to provide an eye 5, the purpose of which will be hereinafter more fully described. On each side of the lip 4, the plate 2 is provided with the upwardly and inwardly inclined tongues 6 which engage the side faces of the hoof adjacent to the lower portion thereof and form means for retaining the forward portion of the hoof in position on the plate.

A relatively broad strap 7 is folded intermediate its ends to form a loop 8. The free ends of this strap are brought under the plate 2 at the rear edge thereof and are preferably clamped into position by means of rivets or the like 9, which extend through the strap and a section of strap iron 10 which firmly clamps the strap terminals against displacement. The strap iron 10 is bent intermediate its ends to provide an upwardly extending extension 10' which forms a guard for the lower end of the strap 7 and prevents the same from becoming worn. As stated, the strap 7 is relatively wide and is adapted to engage the rear face of the horse's hoof and slidably receives the retaining strap 11, which extends around the upper portion of the hoof.

The eye 5 loosely carries a ring 12, which receives the strap 11 and forms a guide for the same and additional means whereby the strap may be prevented from riding upward on the horse's hoof and for holding the forward portion of the shoe in place. The terminals of the strap 11 are adjustably secured together by means of an ordinary or any preferred form of buckle 13. Front and rear calks 14 and 15 are secured to the under surface of plate 2 and the same are in the form of angle bars and include an attaching base 16 and the vertical ground engaging portion 17. Suitable rivets or the like extend through the attaching portion 16 into the plate 2.

The forward calk 14 extends transversely of the plate, while the side calks 15 extend divergently from the rear edge of the plate and flush with the side edges thereof.

From the foregoing description, it can be seen that an improved horseshoe is provided, which can be quickly and readily attached to or detached from a horse's hoof, without necessitating the driving of nails into the hoof and which will effectively protect the hoof from splitting and the like.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion, and arrangement of parts may be resorted to, when required, without sacrificing any of the advantages of my invention as set forth.

What I claim as new is:

1. A horseshoe comprising a substantially flat plate arranged to engage the lower surface of a horse's hoof, a central upwardly extending tongue formed on the forward edge of the plate, said tongue having its upper end reduced and bent to form an eye, a ring loosely carried by said eye, tongues formed on each side of the central tongue and carried by the side edges of the plate, a relatively broad flat strap carried by the rear portion of the plate and arranged to engage the rear portion of the horse's hoof, said strap being doubled to form a loop, an adjustable strap carried by said loop, and arranged to encircle the upper portion of the horse's hoof, said ring being adapted to receive said adjustable strap, as and for the purpose specified.

2. A horseshoe comprising a substantially flat plate arranged to engage the lower surface of a horse's hoof, a tongue extending upwardly from the forward portion of the plate and having its upper end portion extended to form an eye, a ring loosely carried by said eye, tongues extending from the side portions of the plate, a strap bent back upon itself to provide a loop and connected with the rear portion of the plate and arranged to engage the rear portion of a horse's hoof, and an adjustable strap carried by said loop and arranged to encircle the upper portion of a horse's hoof with one end portion extending through said ring.

In testimony whereof I affix my signature in presence of two witnesses.

HERMAN A. FREY.

Witnesses:
EMERY E. JOHNSON,
W. E. ALKIRE.